(12) United States Patent
Imai et al.

(10) Patent No.: US 12,023,804 B2
(45) Date of Patent: Jul. 2, 2024

(54) ROBOT ARM AND ROBOT SYSTEM

(71) Applicant: SEIKO EPSON CORPORATION, Tokyo (JP)

(72) Inventors: Daisuke Imai, Matsumoto (JP); Takayuki Iijima, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/993,086

(22) Filed: Nov. 23, 2022

(65) Prior Publication Data
US 2023/0166395 A1    Jun. 1, 2023

(30) Foreign Application Priority Data

Nov. 26, 2021    (JP) .................. 2021-192567

(51) Int. Cl.
*B25J 19/00*     (2006.01)
*B25J 9/00*      (2006.01)
*B25J 9/10*      (2006.01)
*B25J 9/16*      (2006.01)
*B25J 9/04*      (2006.01)

(52) U.S. Cl.
CPC ............ *B25J 9/104* (2013.01); *B25J 9/0009* (2013.01); *B25J 9/1694* (2013.01); *B25J 19/0029* (2013.01); *B25J 9/042* (2013.01)

(58) Field of Classification Search
CPC . B25J 9/104; B25J 9/0009; B25J 9/009; B25J 9/042; B25J 19/0029; B25J 9/1694; B25J 19/0025
See application file for complete search history.

(56) References Cited

U.S. PATENT DOCUMENTS

| | | | | |
|---|---|---|---|---|
| 5,205,701 A | * | 4/1993 | Kigami | B25J 19/0029 285/305 |
| 6,791,291 B2 | * | 9/2004 | Shimizu | B25J 9/1615 318/568.1 |
| 6,893,204 B1 | * | 5/2005 | Suzuki | B65G 49/067 414/744.5 |
| 2005/0193854 A1 | * | 9/2005 | Sanemasa | H02G 11/00 74/490.02 |

(Continued)

FOREIGN PATENT DOCUMENTS

| | | |
|---|---|---|
| JP | H07-116974 A | 5/1995 |
| JP | 2005-246532 A | 9/2005 |

(Continued)

*Primary Examiner* — Bobby Rushing, Jr.
(74) *Attorney, Agent, or Firm* — Harness, Dickey & Pierce, P.L.C.

(57) ABSTRACT

A robot arm includes a first member, and a second member translating along an axis located in the first member or rotating around the axis, and the first member has a base, a drive unit generating a drive force, a joint portion having a driven pulley and transmitting the drive force to the second member, a belt transmitting the drive force generated by the drive unit to the driven pulley, a sensor provided in a position overlapping with a region surrounded by the driven pulley and the belt in a plan view along the axis and detecting vibration, a wire routed to the region and coupled to the sensor, and a supporting member provided in the region and supporting the wire.

15 Claims, 10 Drawing Sheets

(56) References Cited

U.S. PATENT DOCUMENTS

| | | | | |
|---|---|---|---|---|
| 2012/0215356 A1* | 8/2012 | Igarashi | ................... | B25J 19/02 |
| | | | | 901/46 |
| 2015/0321344 A1* | 11/2015 | Hahakura | ................ | B25J 19/04 |
| | | | | 74/490.02 |
| 2015/0321357 A1* | 11/2015 | Igarashi | ................ | B25J 9/1641 |
| | | | | 901/46 |
| 2015/0321361 A1* | 11/2015 | Hahakura | ................ | B25J 9/044 |
| | | | | 901/14 |
| 2017/0008170 A1* | 1/2017 | Igarashi | ................ | B25J 9/1628 |
| 2017/0259436 A1* | 9/2017 | Nakayama | ............ | B25J 19/0029 |
| 2019/0134810 A1* | 5/2019 | Goto | ....................... | B25J 13/088 |
| 2019/0366562 A1* | 12/2019 | Zhang | ................... | B25J 19/0041 |
| 2019/0389077 A1 | 12/2019 | Hoshino et al. | | |

FOREIGN PATENT DOCUMENTS

| | | | | |
|---|---|---|---|---|
| JP | 2007-237342 A | | 9/2007 | |
| JP | 2009-196059 A | | 9/2009 | |
| JP | 2011-218488 A | | 11/2011 | |
| JP | 2017-042836 A | | 3/2017 | |
| JP | 2019162700 A | * | 9/2019 | .............. B25J 19/00 |
| JP | 2020-001108 A | | 1/2020 | |
| JP | 2020011361 A | * | 1/2020 | ............ B25J 13/088 |
| WO | WO-8707199 A1 | * | 12/1987 | .......... B25J 19/0029 |

\* cited by examiner

ROBOT ARM AND ROBOT SYSTEM

The present application is based on, and claims priority from JP Application Serial Number 2021-192567, filed Nov. 26, 2021, the disclosure of which is hereby incorporated by reference herein in its entirety.

BACKGROUND

1. Technical Field

The present disclosure relates to a robot arm and a robot system.

2. Related Art

With labor cost rise and labor shortage, various robots are increasingly introduced into manufacturing sites. The robots include robot arms making various motions and automate work manually performed in the past.

For example, JP-A-7-116974 discloses a scalar robot including a main body and a horizontal articulated arm coupled to the main body. The horizontal articulated arm includes a first arm and a second arm. The proximal end portion of the first arm is pivotably coupled to the main body via a rotation shaft extending vertically. Further, the proximal end portion of the second arm is pivotably coupled to the distal end portion of the first arm via another pivot shaft extending vertically. Furthermore, in the distal end portion of the second arm, an actuation shaft formed using a spline shaft of a ball spline, mechanisms moving the actuation shaft in axial directions and rotating the actuation shaft around the axis, a Z-axis motor driving the actuation shaft in the axial directions, and an R-axis motor rotationally driving the actuation shaft around the axis. A drive force is transmitted between the Z-axis motor and the movement mechanism via a pulley, a timing belt, or the like. Similarly, a drive force is transmitted between the R-axis motor and the rotation mechanism via a pulley, a timing belt, or the like. By the transmission of the drive forces, the actuation shaft may be moved or rotated and a chuck member attached to the actuation shaft is operated.

Recently, upgrading of robots has been desired and demand for attachment of various functional components to robot arms has been increased with the upgrading. It is necessary to couple the functional components between the robot main body and themselves via power-line wires and communication-line wires. These wires are laid inside of the robot arm and prevents disconnection with contact between the robot arm and an object or the like. Further, the functional components include e.g. a sensor detecting the motion of the robot arm. The functional component such as a sensor often exhibits higher characteristics when attached to the distal end portion of the robot arm. Accordingly, the wires are laid from the proximal end portion to the distal end portion of the robot arm to longitudinally traverse the robot arm.

However, drive force transmission components including the timing belt are placed inside of the robot arm. When the wires for the sensor or the like contact the drive force transmission component, disconnection and poor connection may be caused. Particularly, when the wires are not fixed, the wires swing with the motion of the robot arm and are likely to contact the timing belt or the like. Accordingly, there is a challenge to realize a robot arm in which the swing of the wires of the sensor etc. is suppressed by fixation of the wires inside of the robot arm or the like.

SUMMARY

A robot arm according to an application example of the present disclosure includes a first member, and a second member translating along an axis located in the first member or rotating around the axis, and the first member has a base, a drive unit generating a drive force, a joint portion having a driven pulley and transmitting the drive force to the second member, a belt transmitting the drive force generated by the drive unit to the driven pulley, a sensor provided in a position overlapping with a region surrounded by the driven pulley and the belt in a plan view along the axis and detecting vibration, a wire routed to the region and coupled to the sensor, and a supporting member provided in the region and supporting the wire.

A robot arm according to an application example of the present disclosure includes a first member, and a second member translating along an axis located in the first member or rotating around the axis, and the first member has a base, a drive unit generating a drive force, a joint portion having a driven pulley and transmitting the drive force to the second member, a belt transmitting the drive force generated by the drive unit to the driven pulley, a wire routed to a region surrounded by the driven pulley and the belt, and a supporting member provided in the region and supporting the wire.

A robot system according to an application example of the present disclosure includes the robot arm according to the application example of the present disclosure, and a control apparatus controlling a motion of the robot arm.

DESCRIPTION OF EXEMPLARY EMBODIMENTS

As below, preferred embodiments of a robot arm and a robot system according to the present disclosure will be explained in detail with reference to the accompanying drawings.

1. Robot System

First, a robot system according to an embodiment will be explained.

Figure 1:
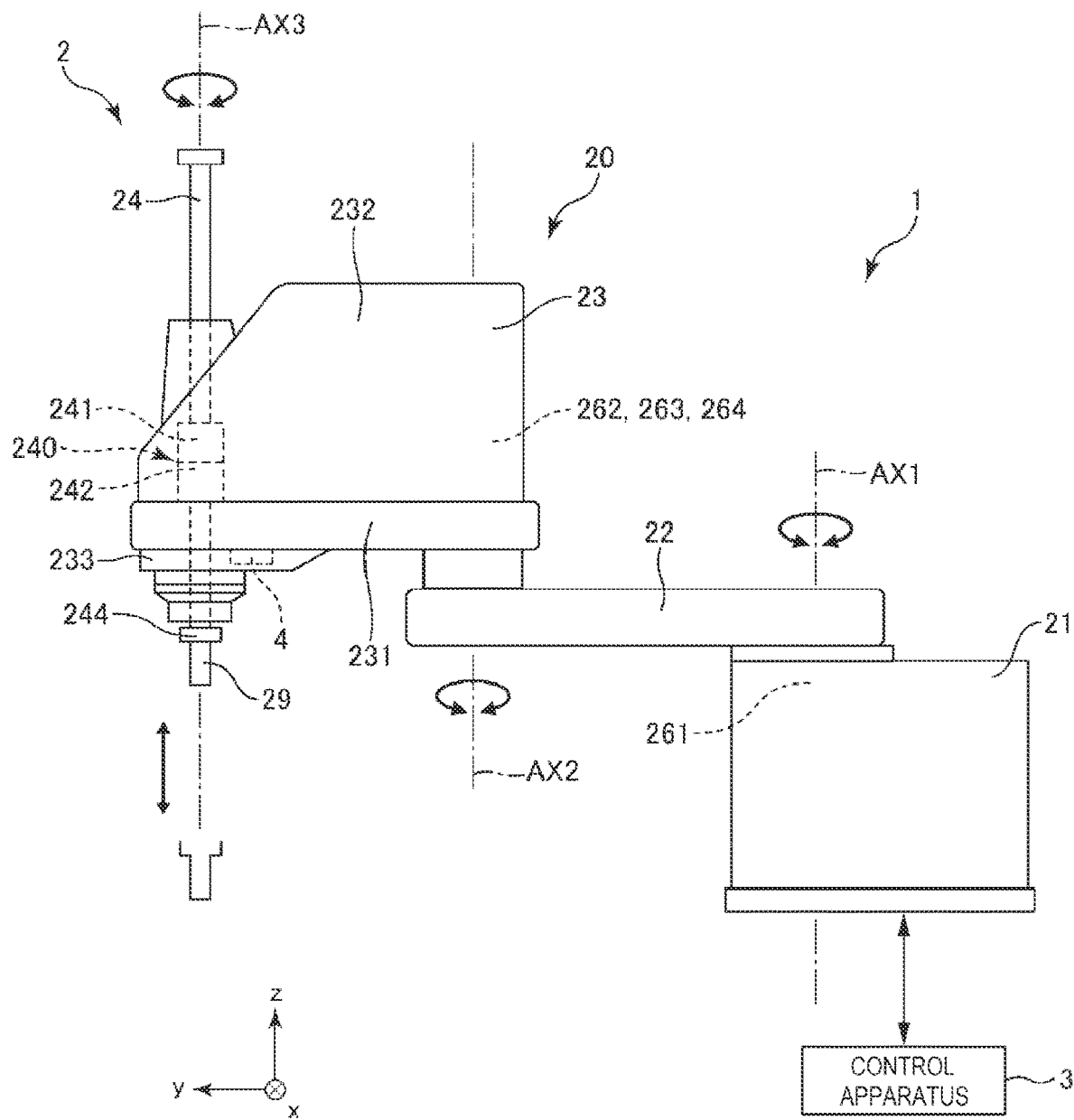
FIG. 1 is a side view showing a robot system according to an embodiment.

FIG. 1 is a side view showing a robot system 1 according to an embodiment. In the respective drawings of the application, for convenience of explanation, an x-axis, a y-axis, a z-axis are set as three axes orthogonal to one another and respectively shown by arrows. In the following description, directions parallel to the x-axis are referred to as "x-axis directions", directions parallel to the y-axis are referred to as "y-axis directions", and directions parallel to the z-axis are referred to as "z-axis directions". Further, in the following description, head sides of the respective illustrated arrows are referred to as "+ (plus)" and the tail sides are referred to as "− (minus)". Furthermore, in the following description, for convenience of explanation, the +z-axis direction is referred to as "upper" and the −z-axis direction is referred to as "lower".

The robot system 1 shown in FIG. 1 includes a robot 2 and a control apparatus 3 controlling operation of the robot 2. The application of the robot system 1 is not particularly limited to, but includes e.g. holding, transport, assembly, inspection, etc. of workpieces.

1.1. Robot

In the embodiment, the robot 2 is a horizontal articulated robot (scalar robot). The robot 2 includes a base 21 and a robot arm 20. In the embodiment, the robot arm 20 has a first arm 22, a second arm 23, a shaft 24, a payload 244, and an end effector 29, which will be described later.

1.1.1. Base

The base 21 is fixed to an installation surface (not shown) by bolts or the like. The installation surface includes e.g. a floor surface, a wall surface, a ceiling surface, and a top surface of a table or a platform. The outer shape of the base 21 shown in FIG. 1 is substantially a rectangular parallelepiped shape. Note that the outer shape of the base 21 may be any shape, not limited to the shape shown in FIG. 1.

The base 21 has a drive unit 261. The drive unit 261 generates a drive force for pivoting the first arm 22 around a first axis AX1 relative to the base 21. Further, the drive unit 261 has an encoder (not shown) detecting the amount of rotation thereof. The pivot angle of the first arm 22 relative to the base 21 may be detected based on the output from the encoder.

1.1.2. Robot Arm

The robot arm 20 is coupled to the base 21 and has an attitude controlled by the control apparatus 3. Thereby, the end effector 29 is held in intended position and attitude and various kinds of work are realized. In the robot arm 20 shown in FIG. 1, the first arm 22, the second arm 23 (first member), the shaft 24 (second member), the payload 244, and the end effector 29 are sequentially coupled. Note that, in the following description, for convenience of explanation, the end effector 29 side of the robot 2 is referred to as "distal end" and the base 21 side is referred to as "proximal end".

The first arm 22 is pivotable around the first axis AX1 parallel to the z-axis relative to the base 21. The second arm 23 is provided in the distal end portion of the first arm 22 and pivotable around a second axis AX2 parallel to the first axis AX1. The shaft 24 is provided in the distal end portion of the second arm 23 and pivotable around a third axis AX3 parallel to the second axis AX2 and translatable along the third axis AX3.

The second arm 23 (first member) has an arm base 231 (main body), an upper cover 232, a lower cover 233, drive units 262, 263, 264, a joint portion 240, and an inertial sensor 4.

The arm base 231 is a skeleton of the second arm 23 and supports the drive units 262, 263, 264 etc. The upper cover 232 is provided at the upside of the arm base 231 and covers the drive units 262, 263, 264 etc. The lower cover 233 is provided at the downside of the arm base 231 and covers the inertial sensor 4 etc. mounted on the lower surface of the arm base 231.

The drive unit 262 is located in the proximal end portion of the arm base 231 and generates a drive force for pivoting the second arm 23 relative to the first arm 22 around the second axis AX2. The drive unit 262 has a motor, a reducer, an encoder, etc. respectively not shown. The pivot angle of the second arm 23 relative to the first arm 22 may be detected based on the output from the encoder.

The drive unit 263 is located between the proximal end portion and the distal end portion of the arm base 231 and generates a drive force for rotating a ball screw nut 241 and translating the shaft 24 in directions along the third axis AX3. The drive unit 263 has a motor, a reducer, an encoder, etc. respectively not shown. The amount of translation of the shaft 24 relative to the second arm 23 may be detected based on the output from the encoder. The drive unit 264 is located between the proximal end portion and the distal end portion of the arm base 231 and generates a drive force for rotating a spline nut 242 and rotating the shaft 24 around the third axis AX3. The drive unit 264 has a motor, a reducer, an encoder, etc. respectively not shown. The amount of rotation of the shaft 24 relative to the second arm 23 may be detected based on the output from the encoder.

The joint portion 240 transmits the drive forces to the shaft 24. Specifically, the joint portion converts the drive forces from the drive units 263, 264 into motions of translation and rotation of the shaft 24.

The shaft 24 is an axial body having a cylindrical shape. The shaft 24 is translatable along the third axis AX3 along the vertical direction and rotatable around the third axis AX3 relative to the second arm 23.

Further, the ball screw nut 241 and the spline nut 242 are placed in the middle of the shaft 24 in the longitudinal direction and the shaft 24 is supported by these nuts.

The payload 244 for attachment of the end effector 29 is provided in the distal end portion of the shaft 24. The end effector 29 attached to the payload 244 is not particularly limited to, but includes e.g. a hand holding an object, a tool machining an object, and an inspection apparatus inspecting an object. Note that the robot arm 20 may have a configuration without the end effector 29.

Next, the respective parts of the second arm 23 will be described in detail.

Figure 2:
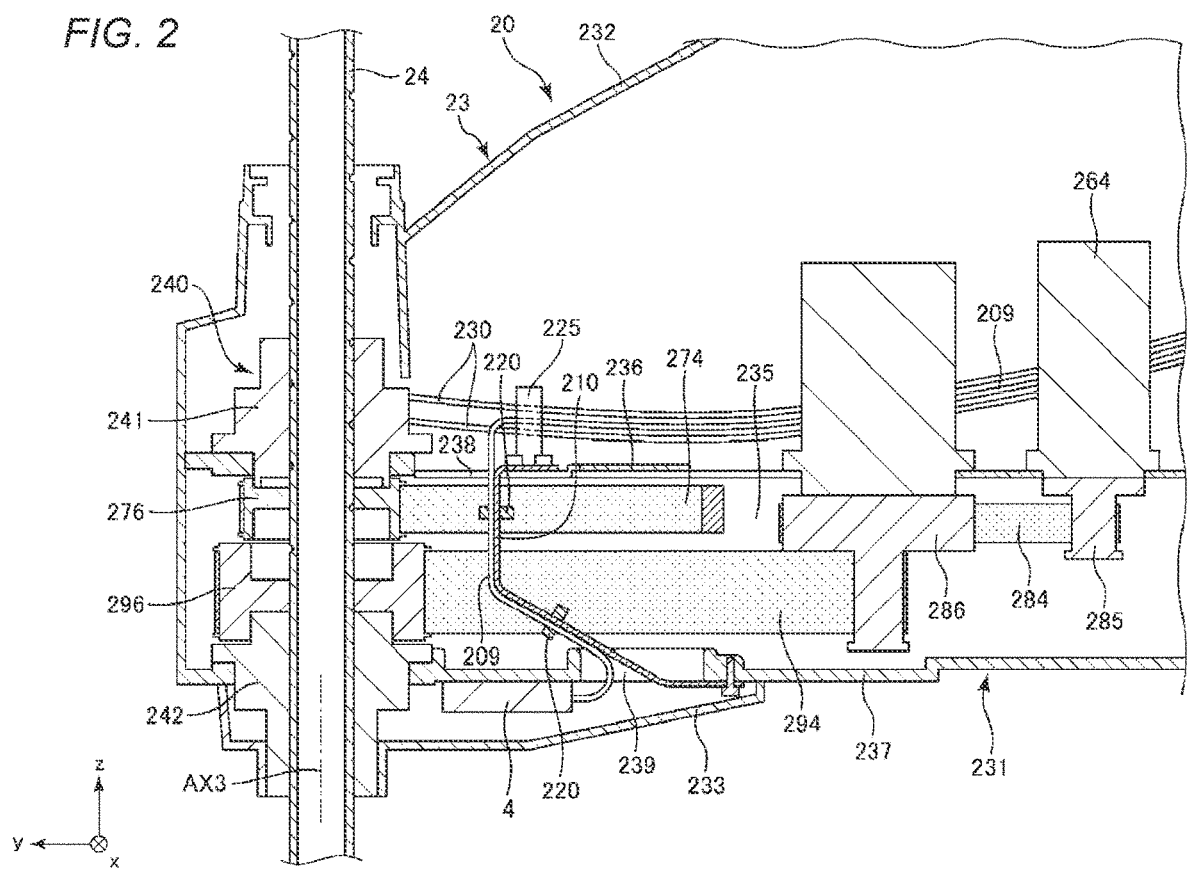
FIG. 2 is a partially sectional view of a second arm shown in FIG. 1.
Figure 3:
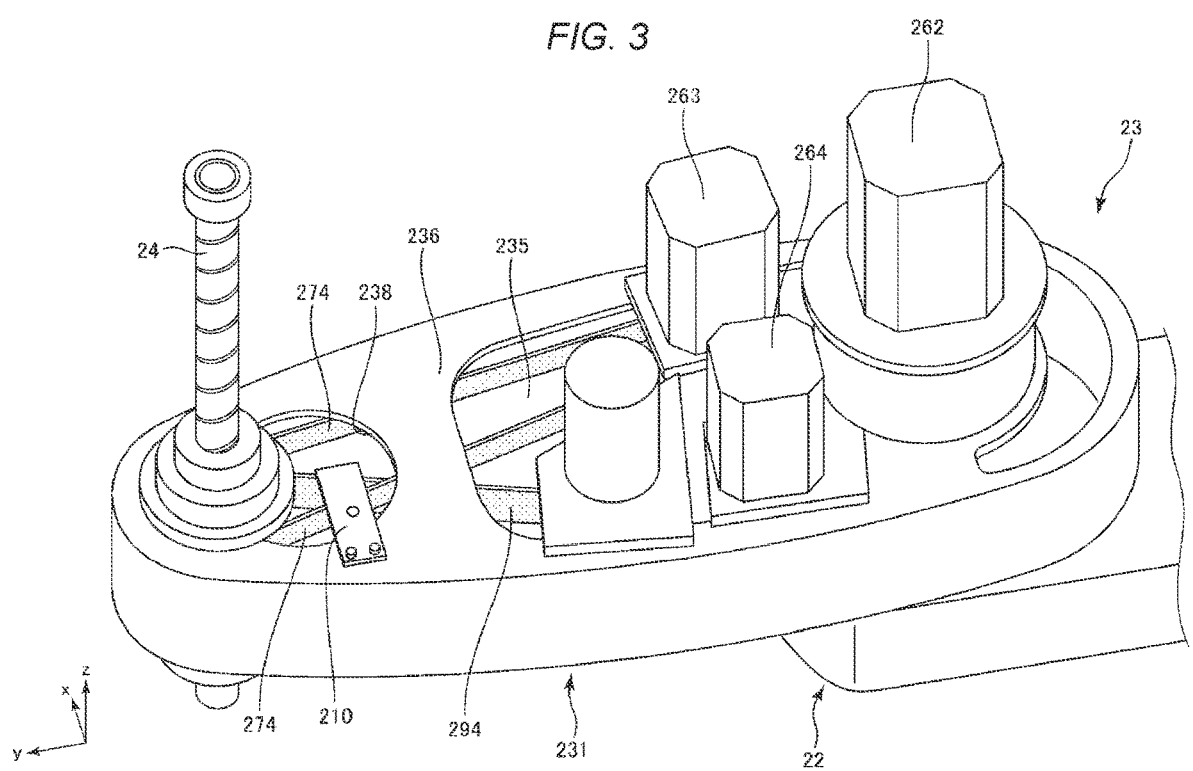
FIG. 3 is a perspective view of an internal structure of the second arm shown in FIG. 1 as seen from a plus side toward a minus side of a z-axis.
Figure 4:
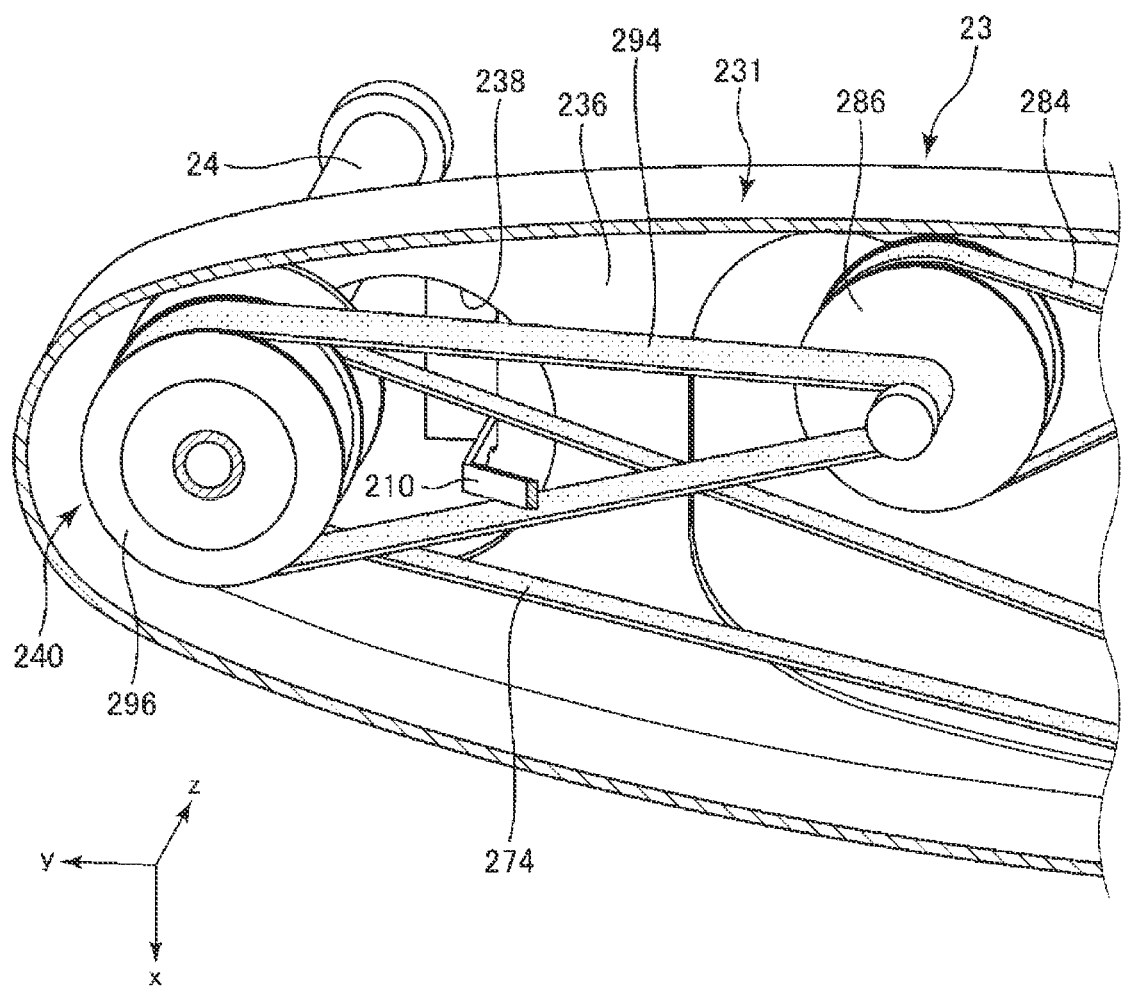
FIG. 4 is a partially sectional perspective view of a section of the second arm shown in FIG. 3 cut along an xy-plane as seen from the minus side toward the plus side of the z-axis.
Figure 5:
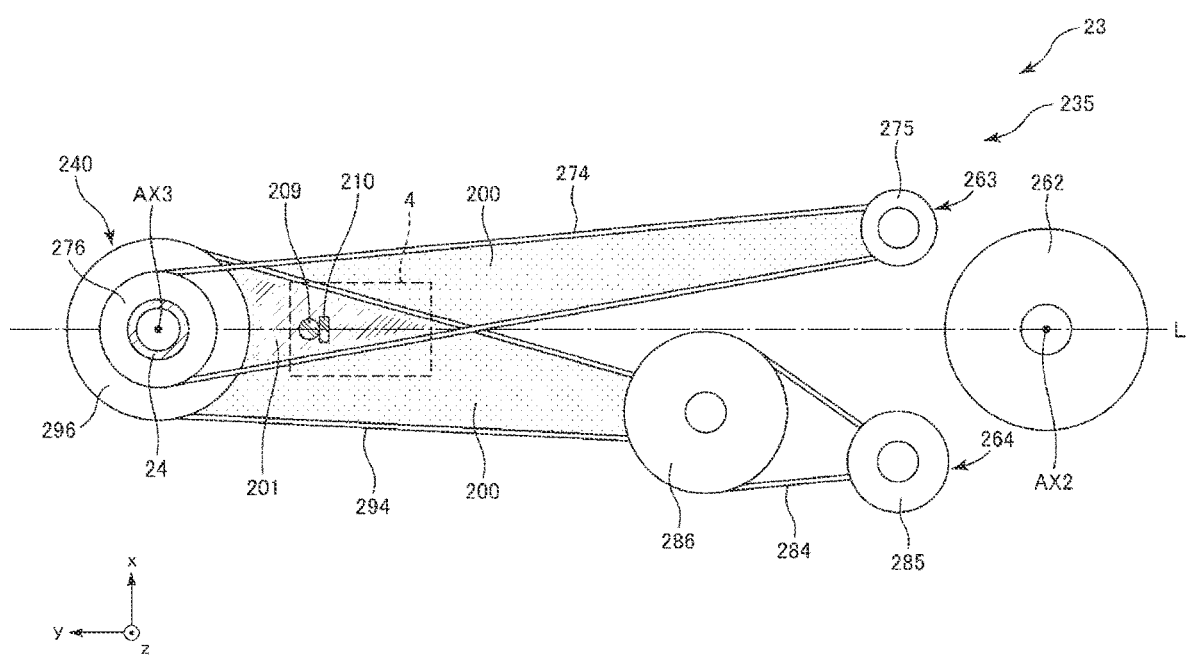
FIG. 5 shows a region surrounded by driven pulleys coupled to a shaft and belts.

FIG. 2 is a partially sectional view of the second arm 23 shown in FIG. 1. FIG. 3 is a perspective view of an internal structure of the second arm 23 shown in FIG. 1 as seen from the plus side toward the minus side of the z-axis. FIG. 4 is a partially sectional perspective view of a section of the second arm 23 shown in FIG. 3 cut along an xy-plane as seen from the minus side toward the plus side of the z-axis. FIG. 5 shows a region 200 surrounded by driven pulleys 276, 296 coupled to the shaft 24 and belts 274, 294. Note that, in FIGS. 3 and 4, the upper cover 232 is omitted. Further, in FIGS. 2 to 4, at least part of the members not to be described as below is omitted.

The second arm 23 has the belts 274, 284, 294, drive pulleys 275, 285, and the driven pulleys 276, 286, 296 shown in FIG. 5. The above described joint portion 240 has the driven pulley 276 coupled to the ball screw nut 241 and the driven pulley 296 coupled to the spline nut 242.

The drive pulley 275 shown in FIG. 5 is coupled to the drive unit 263 shown in FIG. 3. The driven pulley 276 shown in FIG. 5 is coupled to the ball screw nut 241 shown in FIG. 2. The belt 274 shown in FIG. 5 is an endless belt looped over the drive pulley 275 and the driven pulley 276. The drive force generated in the drive unit 263 is transmitted to the ball screw nut 241 via the drive pulley 275, the belt 274, and the driven pulley 276. Thereby, the shaft 24 shown in FIG. 2 may be translated in the directions along the third axis AX3, i.e., the z-axis directions.

The drive pulley 285 shown in FIG. 5 is coupled to the drive unit 264 shown in FIG. 3. The driven pulley 286 shown in FIG. 5 is a reduction pulley reducing the rotation speed and transmitting the drive force from the belt 284 to the belt 294. The driven pulley 296 shown in FIG. 5 is coupled to the spline nut 242 shown in FIG. 2. The belt 284 shown in FIG. 5 is an endless belt looped over the drive pulley 285 and the driven pulley 286. The belt 294 is an endless belt looped over the driven pulley 286 and the driven pulley 296. The drive force generated in the drive unit 264 is transmitted to the spline nut 242 via the drive pulley 285, the belt 284, the driven pulley 286, the belt 294, and the driven pulley 296. Thereby, the shaft 24 shown in FIG. 2 may be rotated around the third axis AX3.

The arm base 231 is a rigid body formed using e.g. various metal materials, various hard resin materials, or the like. The arm base 231 shown in FIG. 2 has a hollow structure and includes an internal space 235, a top plate 236 (first base member) provided at the upside of the internal space 235, and a bottom plate 237 (second base member) provided at the downside of the internal space 235.

The top plate 236 has a through hole 238 (first through hole) penetrating in directions parallel to the third axis AX3. The through hole 238 provides communication between the upside of the top plate 236, i.e., the inside of the upper cover 232 and the internal space 235.

The bottom plate 237 has a through hole 239 (second through hole) penetrating in directions parallel to the third axis AX3. The through hole 239 provides communication between the downside of the bottom plate 237, i.e., the inside of the lower cover 233 and the internal space 235.

The through holes 238, 239 may have functions as ventilation holes for eliminating air pressure differences among the inside of the upper cover 232, the internal space 235, and the inside of the lower cover 233 from each other.

Note that the configurations of the arm base 231, the upper cover 232, and the lower cover 233 are not limited to the above described configurations. For example, at least two of the configurations may be integrated.

The drive units 262, 263, 264 are fixed to the upper surface of the top plate 236. The output shafts (not shown) of the drive units 262, 263, 264 extend in the internal space 235.

As shown in FIGS. 2 and 5, the internal space 235 houses the belts 274, 284, 294, the drive pulleys 275, 285, and the driven pulleys 276, 286, 296.

In the embodiment, as shown in FIG. 5, the drive unit 262 is provided in a position overlapping with the second axis AX2 of the arm base 231. Further, in the embodiment, the drive units 263, 264 are respectively provided in positions between the second axis AX2 and the third axis AX3 of the arm base 231. Furthermore, as shown in FIG. 5, the drive units 263, 264 are arranged in the x-axis directions with a straight line L connecting the second axis AX2 and the third axis AX3 in between. The drive units 263, 264 are arranged in the x-axis directions with the straight line L in between, and thereby, the distribution of the weight of the second arm 23 may be made more uniform. Thereby, generation of abnormal vibration or the like with the pivot of the second arm 23 may be suppressed. The driven pulley 286 is provided in a position between the drive unit 264 and the driven pulley 296. Note that the placement of the drive units 262, 263, 264 in the arm base 231 is not limited to the above described placement.

The inertial sensor 4 may be an angular velocity sensor detecting an angular velocity, an acceleration sensor detecting an acceleration, or a composite sensor detecting both. Further, the number of axes around which the angular velocity sensor detects angular velocities is not particularly limited, but may be one, two, or three. Similarly, the number of axes along which the acceleration sensor detects accelerations is not particularly limited, but may be one, two, or three.

As shown in FIG. 2, the inertial sensor 4 is provided on the lower surface of the bottom plate 237. Further, the inertial sensor 4 is provided near the third axis AX3 of the lower surface of the bottom plate 237. Thereby, when the second arm 23 pivots, detection sensitivity of the angular velocity or the acceleration by the inertial sensor 4 may be increased. Specifically, as shown in FIG. 5, the inertial sensor 4 is provided in a position overlapping with "region 200" determined by the driven pulleys 276, 296 and the belts 274, 294.

The belts 274, 294 are looped over the driven pulleys 276, 296 coupled to the shaft 24, respectively. Accordingly, as shown in FIG. 5, in a plan view along the third axis AX3, a region surrounded by the belts 274, 294 extending from the driven pulleys 276, 296 in the −y-axis direction is produced. The region is referred to as "region 200". The inertial sensor 4 is placed in a position overlapping with the region 200 of the lower surface of the bottom plate 237 in the plan view along the third axis AX3. By the placement, the detection sensitivity of the inertial sensor 4 becomes better. Note that the position overlapping with the region 200 refers to a position in which at least a part of the inertial sensor 4 overlaps with the region 200 in the plan view. In FIG. 5, the region 200 is dotted.

A wire 209 is coupled to the inertial sensor 4. The wire 209 includes e.g. a power-line wire supplying electric power for driving the inertial sensor 4 and a signal-line wire transmitting a control signal for controlling the operation of the inertial sensor 4 and outputting a detection signal of the angular velocity or the acceleration detected by the inertial sensor 4. Note that, in a case of the signal-line wire, an electric wire or an optical wire such as an optical fiber or an optical waveguide may be employed. Therefore, in the specification, "the wire 209 is coupled" refers to electrical or optical coupling. The wire 209 is routed from the inside of the base 21 to the inertial sensor 4. Specifically, though not shown, the wire 209 sequentially passes inside of the base 21 and inside of the first arm 22 and is routed to the inside of the upper cover 232 provided at the upside of the top plate 236 in the second arm 23. Further, the wire 209 sequentially passes through the through hole 238 of the top plate 236, the region 200, and the through hole 239 of the bottom plate 237 and is routed to the inertial sensor 4.

As shown in FIG. 5, the wire 209 is routed to pass through the region 200 in the internal space 235, and thereby, the wire 209 may be routed to the inertial sensor 4 provided on the lower surface of the bottom plate 237 shown in FIG. 2 in a shorter path length. As a result, the wire 209 may be made lighter and an influence by disturbance of the signal transmitted by the wire 209 may be suppressed to be less.

In related art, there is a problem that, when a wire is fixed to an inner wall surface of the robot arm, the path length of the wire tends to be longer. When the path length of the wire is longer, the weight of the robot arm increases. Therefore, it is necessary to lay the wire in as short a path as possible in view of the lighter weight of the robot arm. Particularly, a functional component often exhibits especially high characteristics when attached to the lower part of the robot arm. On the other hand, the timing belts etc. are collected in the robot arm. Accordingly, it is particularly difficult to secure the path of the wire to the lower part of the robot arm while suppressing the path length of the wire.

However, when the wire 209 is routed in the region 200, the wire 209 and the belts 274, 294 may contact and the wire 209 may be damaged. Particularly, when the second arm 23 pivots, the wire 209 tends to swing by the centrifugal force and the probability of the contact between the wire 209 and the belts 274, 294 is higher.

Accordingly, in the embodiment, as shown in FIG. 5, a supporting member 210 is provided in the region 200. The supporting member 210 has a columnar shape passing through the inside of the belts 274, 294 from the top plate 236 as shown in FIG. 4 and extending to the bottom plate 237 as shown in FIG. 2. Further, the wire 209 is supported by the supporting member 210. Thereby, the swing of the wire 209 may be suppressed by guiding of the wire 209 along the supporting member 210. As a result, the wire 209 may be appropriately routed in a shorter path length and the probability of the contact between the wire 209 and the belts 274, 294 may be reduced. As shown in FIG. 2, in the plan view along the X-axis directions, the supporting member 210 extends from the through hole 238 in the −Z-axis direction and bends toward the through hole 239 in a position overlapping with the belt 294.

Figure 6:
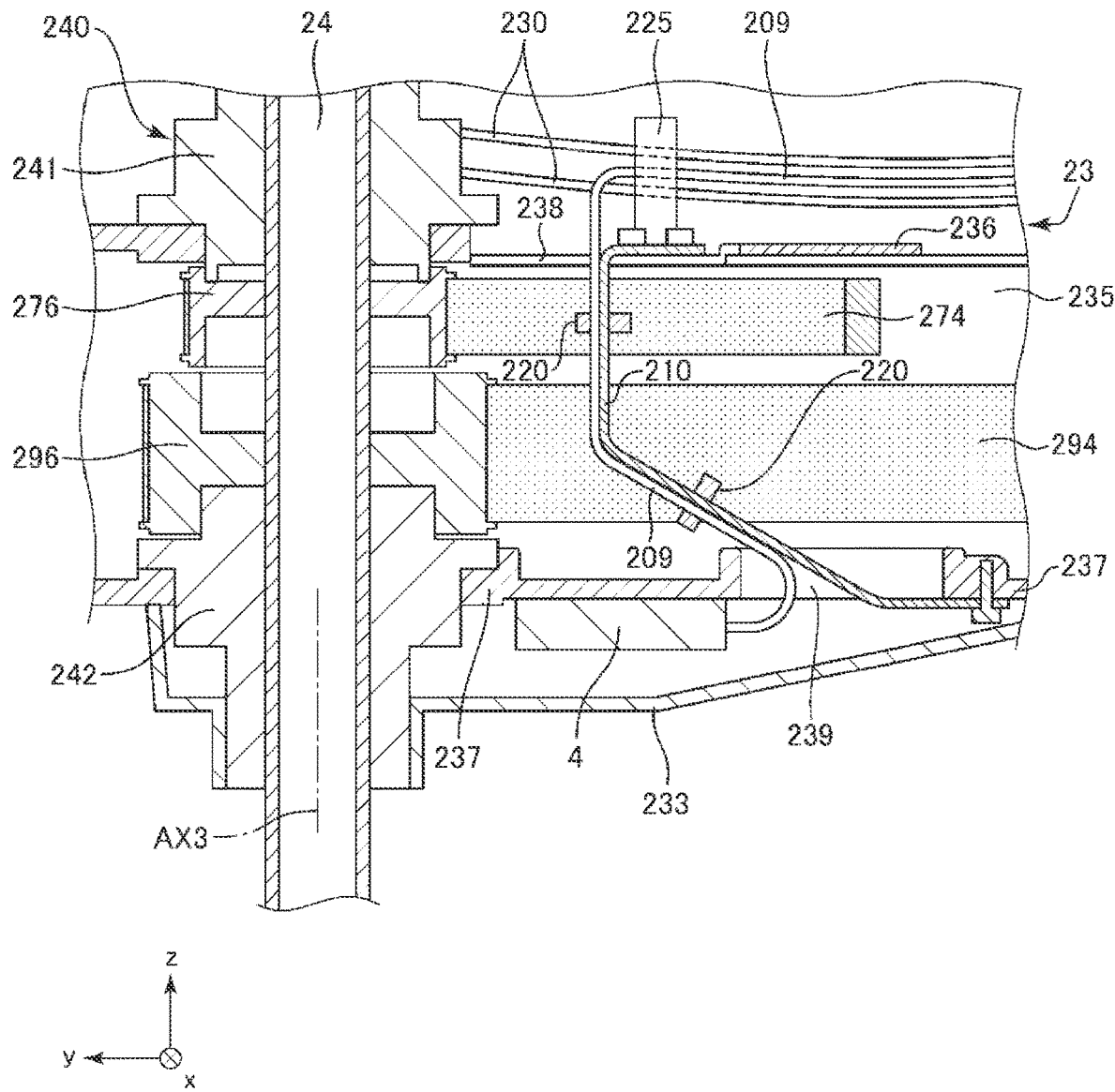
FIG. 6 is a partially enlarged view of FIG. 2 showing routing paths of a wire in an internal space.

FIG. 6 is a partially enlarged view of FIG. 2 showing routing paths of the wire 209 in the internal space 235.

The wire 209 is routed along the supporting member 210 and supported. "Supporting" refers to fixing of the wire 209 to the supporting member 210 to the degree at which the swing of the wire 209 can be suppressed. The fixing method is not particularly limited, but a method using an adhesive, a method of winding the wire 209 around the supporting member 210, or the like may be used. In the embodiment, a method using a cable tie 220 (anchoring member) may be employed. The cable tie 220 is used, and thereby, the work of fixing the wire 209 to the supporting member 210 may be easily and quickly performed. Note that the anchoring member includes a clip, a string, a rubber band, and an adhesive tape in addition to the cable tie 220.

Figure 7:
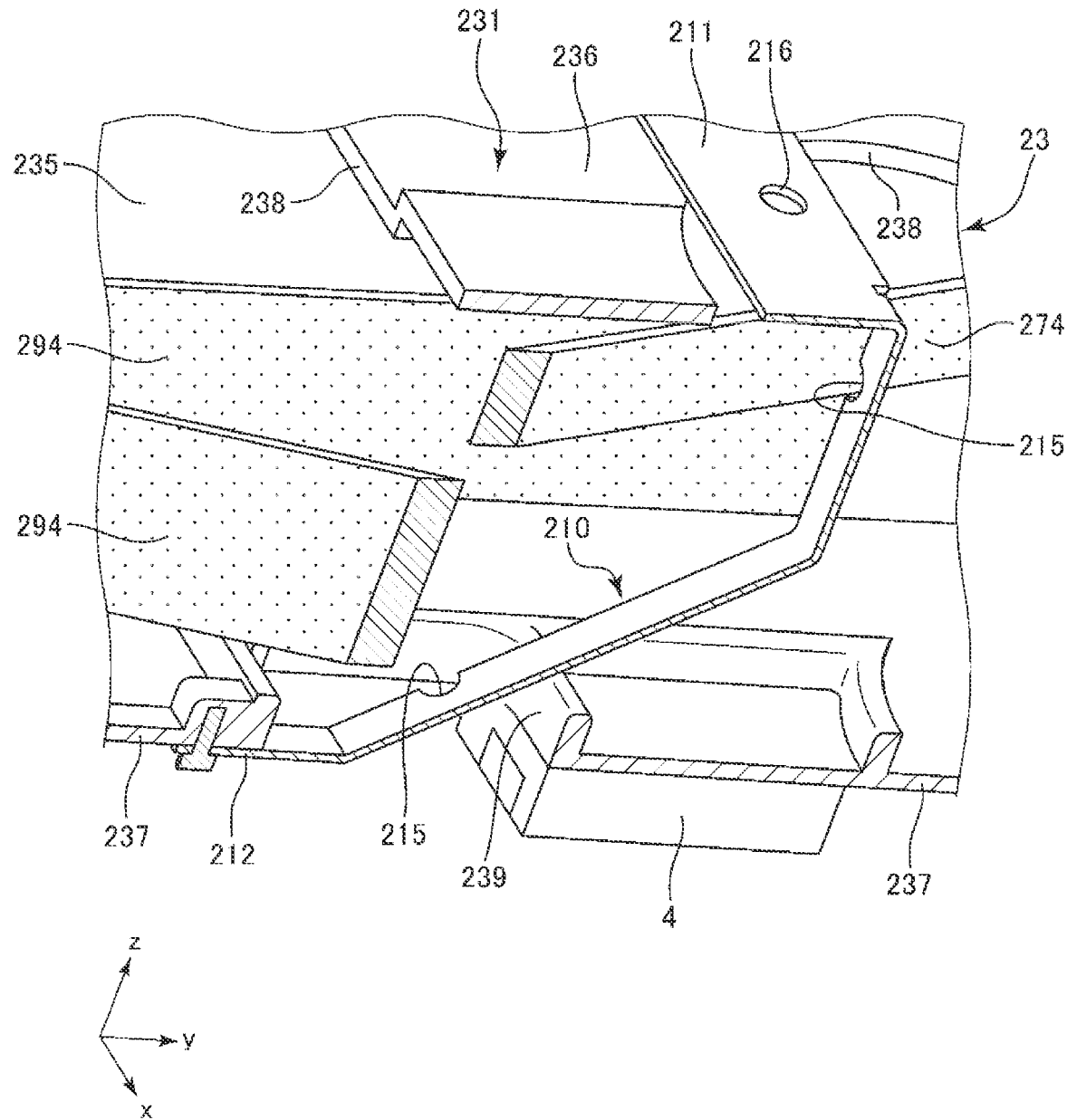
FIG. 7 is a partially enlarged perspective view near a supporting member shown in FIG. 6.

FIG. 7 is a partially enlarged perspective view near the supporting member 210 shown in FIG. 6. Note that, in FIG. 7, a clamp 225, the wire 209, and the cable tie 220 are not shown. Further, in FIG. 7, sections of part of portions are shown.

The supporting member 210 shown in FIG. 7 has a columnar shape with a substantially constant width and has a narrower width portion 215 with a partially narrower width. The width of the supporting member 210 refers to a length in a lateral direction orthogonal to a longitudinal direction of the supporting member 210 in the columnar shape. When the cable tie 220 is attached to the supporting member 210, the narrower width portion 215 contributes to suppression of displacement of the cable tie 220. That is, when the cable tie 220 is attached to the narrower width portion 215, the cable tie 220 is hard to separate from the narrower width portion 215. Accordingly, a failure due to unintended displacement of the cable tie 220 may be suppressed.

Further, the supporting member 210 shown in FIG. 7 has an upper end portion 211 (one end portion) fixed to the upside of the top plate 236, passes through the through hole 238, the inside of the belts 274, 294, and the through hole 239, and has a lower end portion 212 (the other end portion) fixed to the downside of the bottom plate 237. The both end portions are fixed to the arm base 231, and thereby, the swing of the supporting member 210 itself may be suppressed and, as a result, the swing of the wire 209 may be suppressed. The fixing method of the supporting member 210 to the arm base 231 includes e.g. fixing by screwing or fitting, fixing using an adhesive, and fixing using a clip. Furthermore, as shown in FIG. 7, the supporting member 210 has a shape in which the upper end portion 211 has a plate shape along the top plate 236 and a part of the plate bends toward the through hole 238.

The supporting member 210 may be integrated with the arm base 231, however, the supporting member 210 shown in FIG. 7 is separately formed from the arm base 231. Thereby, an assembly sequence that the belts 274, 294 are looped over, and then, the supporting member 210 is attached to the arm base 231 may be employed. As a result, interference by the supporting member 210 may be prevented when the belts 274, 294 are looped over.

A constituent material of the supporting member 210 includes e.g. a metal material including an iron-base alloy such as stainless steel, an aluminum-base alloy, and a titanium-base alloy, a resin material, and a ceramics material.

Note that the supporting member 210 is provided to pass through the region 200, and preferably, avoid the range in which the belts 274, 294 swing. The range in which the belts 274, 294 swing refers to amplitude of flexion of the belts 274, 294 when the second arm 23 pivots. The region 200 is set to avoid the range, and thereby, even when the belts 274, 294 swing, the wire 209 is less damaged.

As shown in FIG. 6, at the upside of the top plate 236, a wire 230 coupling between various apparatuses within the robot arm 20 and the base 21 is routed in addition to the wire 209. These wires 209, 230 are preferably bundled to suppress the swing with the pivot of the second arm 23. In the embodiment, as shown in FIG. 6, the wires 209, 230 are bundled by the clamp 225 fixed to the supporting member 210. Thereby, the swing of the wires 209, 230 may be suppressed and the wire 209 may be easily guided to near the supporting member 210. As a result, the wire 209 may be routed to the supporting member 210 in a shorter path.

Note that the fixing method of the clamp 225 to the supporting member 210 is not particularly limited, but includes e.g. fixing by screwing and fitting and fixing using an adhesive. FIG. 7 shows a screw hole 216 for fixing the clamp 225 provided in the upper end portion 211 of the supporting member 210. The clamp 225 may be fixed to the arm base 231, not to the supporting member 210.

As described above, the robot arm 20 according to the embodiment includes the second arm 23 (first member) and the shaft 24 (second member). The shaft 24 translates along the third axis AX3 located in the second arm 23 or rotates around the third axis AX3.

Further, the second arm 23 has the arm base 231, the drive units 263, 264 generating the drive forces, the joint portion 240, the belts 274, 294, the inertial sensor 4 as the sensor detecting vibration, the wire 209, and the supporting member 210 supporting the wire 209. The joint portion 240 has the driven pulleys 276, 296 and transmits the drive forces to the shaft 24. The belts 274, 294 transmit the drive forces generated by the drive units 263, 264 to the driven pulleys 276, 296. The inertial sensor 4 is provided in the position overlapping with the region 200 surrounded by the driven pulleys 276, 296 and the belts 274, 294 in the plan view along the third axis AX3. Further, the wire 209 is routed to the region 200 and coupled to the inertial sensor 4. Furthermore, the supporting member 210 is provided in the region 200 and supports the wire 209.

According to the configuration, even when the wire 209 is subjected to the centrifugal force, the swing of the wire 209 may be suppressed. Thereby, the probability of the contact between the wire 209 and the belts 274, 294 may be reduced and the damage on the wire 209 may be suppressed.

Further, even when the inertial sensor 4 is placed in the position overlapping with the region 200 of the lower part of the second arm 23, the supporting member 210 is placed in the region 200, and thereby, the path length of the wire 209 may be suppressed to be shorter. Thereby, the wire 209 may be made lighter and the influence by disturbance of the signal transmitted by the wire 209 may be further suppressed.

Note that, in the embodiment, the shaft 24 is translatable along the third axis AX3 along the vertical direction and rotatable around the third axis AX3, however, only one of these motions relating to the shaft 24 may be performed. In addition, in the embodiment, the joint portion 240 has both the ball screw nut 241 and the spline nut 242, however, one of the nuts may be omitted. When the ball screw nut 241 is omitted, the above described region 200 is only the region surrounded by the belt 294 and the driven pulley 296. Or, when the spline nut 242 is omitted, the above described region 200 is only the region surrounded by the belt 274 and the driven pulley 276.

On the other hand, the region 200 in the embodiment is the sum of the region surrounded by the belt 294 and the driven pulley 296 and the region surrounded by the belt 274 and the driven pulley 276. That is, as shown in FIG. 5, in the region 200, there is a region 201 contained in both the region surrounded by the belt 294 and the driven pulley 296 and the region surrounded by the belt 274 and the driven pulley 276. The inertial sensor 4 is provided in the position overlapping with the region 200, and preferably, provided in a position overlapping with the region 201. Thereby, the detection sensitivity of the inertial sensor 4 may be especially increased. In FIG. 5, the region 201 is hatched.

Note that, in FIG. 5, when the straight line L passing through both the second axis AX2 and the third axis AX3 is drawn, the region 201 and the straight line L overlap and the inertial sensor 4 and the straight line L overlap. In view of the detection sensitivity of the inertial sensor 4, the placement is particularly preferable.

The shape of the supporting member 210 may be any shape as long as the member may support the wire 209, however, in the embodiment, is the columnar shape passing through the inside of the belts 274, 294 and extending. Further, the wire 209 is supported along the supporting member 210. According to the configuration, the wire 209 may be guided along the supporting member 210 and the swing of the wire 209 may be suppressed. As a result, the wire 209 may be appropriately routed and the probability of the contact between the wire 209 and the belts 274, 294 may be reduced.

Further, in the robot arm 20 according to the embodiment, the arm base 231 includes the top plate 236 (first base member) and the bottom plate 237 (second base member) facing each other via the internal space 235. The internal space 235 is a space through which the belts 274, 294 pass. The upper end portion 211 (one end portion) of the supporting member 210 is fixed to the top plate 236 and the lower end portion 212 (the other end portion) is fixed to the bottom plate 237.

According to the configuration, the swing of the supporting member 210 itself may be suppressed. Further, the supporting member 210 is separately formed from the arm base 231, and thereby, an assembly sequence that the belts 274, 294 are looped over, and then, the supporting member 210 is attached to the arm base 231 may be employed. As a result, interference by the supporting member 210 may be prevented when the belts 274, 294 are looped over.

In the robot arm 20 according to the embodiment, the top plate 236 (first base member) has the through hole 238 (first through hole) penetrating in directions parallel to the third axis AX3, and the bottom plate 237 (second base member) has the through hole 239 (second through hole) penetrating in the directions parallel to the third axis AX3. Further, the wire 209 is routed in the path passing through the through hole 238, the internal space 235, and the through hole 239.

According to the configuration, the wire 209 may be routed in a shorter path length not around the top plate 236 and the bottom plate 237. Thereby, the wire 209 may be made lighter and the influence by disturbance of the signal transmitted by the wire 209 may be further suppressed.

The robot arm 20 according to the embodiment has the cable tie 220 (anchoring member) anchoring the wire 209 to the supporting member 210.

The cable tie 220 is used, and thereby, the work of fixing the wire 209 to the supporting member 210 may be easily performed.

In the robot arm 20 according to the embodiment, the supporting member 210 has the narrower width portion 215 with the partially narrower width. The cable tie 220 (anchoring member) anchors the wire 209 to the narrower width portion 215.

According to the configuration, the cable tie 220 is harder to move from the narrower width portion 215 to the outside. Thereby, a failure due to unintended displacement of the cable tie 220 may be suppressed.

Note that the robot 2 is not limited to the above described scalar robot, but may be another robot such as a vertical articulated robot or a Cartesian coordinate robot. Further, the number of arms of the vertical articulated robot is not particularly limited.

1.2. Control Apparatus

The operation of the robot 2 is controlled by the control apparatus 3. The control apparatus 3 may be placed outside of the base 21 as shown in FIG. 1, but may be provided inside of the base 21. The control apparatus 3 controls driving of drive units 261, 262, 263, 264 according to a motion program stored in advance. Thereby, the control apparatus 3 controls the motion of the robot arm 20.

As described above, the robot system 1 according to the embodiment includes the robot arm 20 and the control apparatus 3 controlling the motion of the robot arm 20.

According to the robot system 1, even when the robot arm 20 moves, the swing of the wire 209 coupled to the inertial sensor 4 may be suppressed. Thereby, damage on the wire 209 may be suppressed. Further, the path length of the wire 209 may be suppressed to be shorter. As a result, the robot system 1 in which the robot arm 20 can be moved at a higher speed and the wire 209 is harder to be damaged in that case may be realized.

2. First Modified Example

Next, a robot arm according to a first modified example will be explained.

Figure 8:
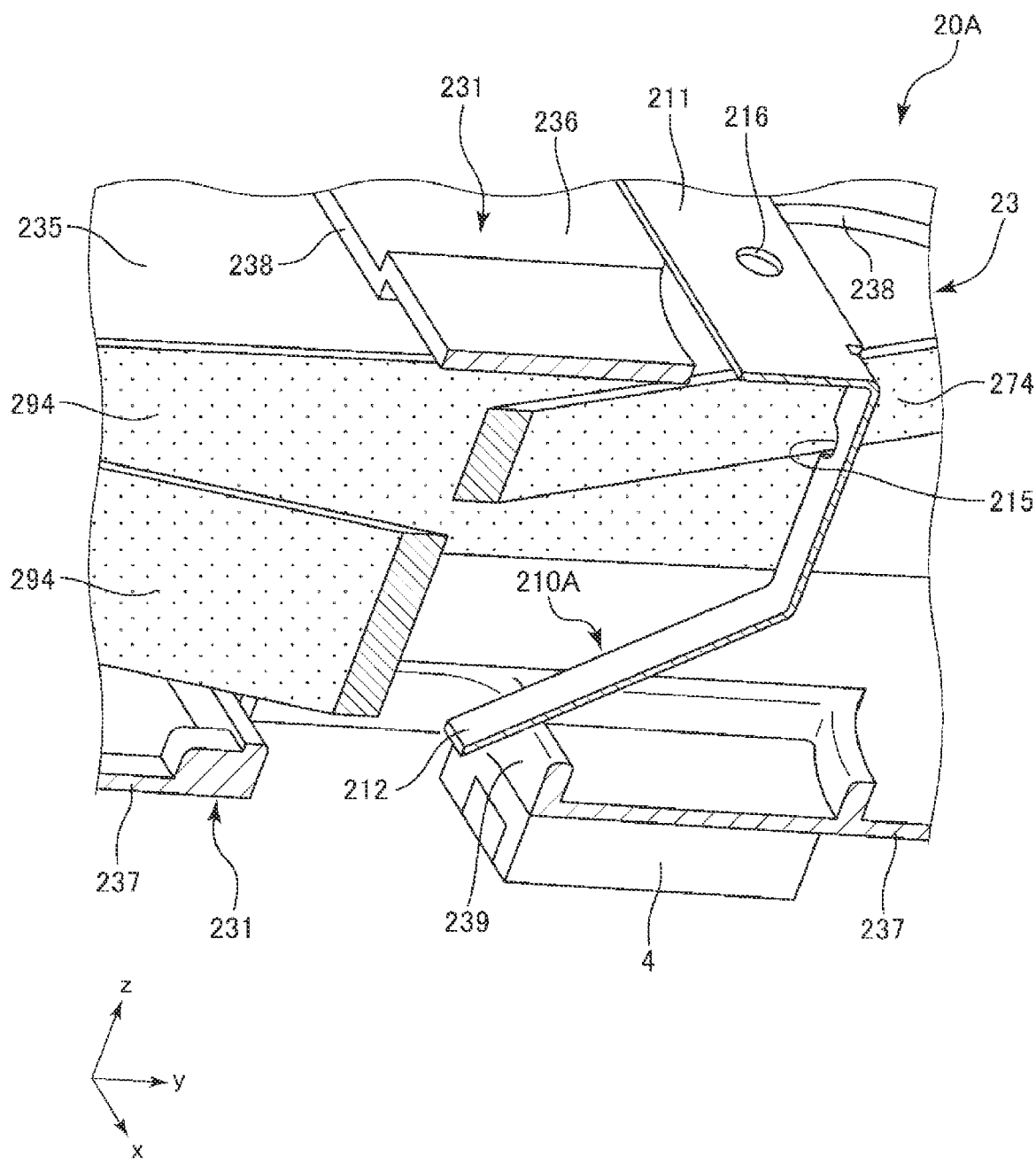
FIG. 8 is a partially enlarged perspective view showing a robot arm according to a first modified example.

FIG. 8 is a partially enlarged perspective view showing a robot arm 20A according to the first modified example. In FIG. 8, sections of part of portions are shown.

As below, the first modified example will be explained. The following explanation will be made with a focus on the differences from the above described embodiment and the explanation of the same items will be omitted. Note that, in FIG. 8, the same configurations as those of the above described embodiment have the same signs.

In the robot arm 20A shown in FIG. 8, like the above described embodiment, the arm base 231 includes the top plate 236 (first base member) and the bottom plate 237 (second base member) facing each other via the internal space 235. The internal space 235 is the space through which the belts 274, 294 pass. The upper end portion 211 (one end portion) of the supporting member 210A is fixed to the top plate 236 and the lower end portion 212 (the other end portion) is separated from the bottom plate 237.

According to the configuration, a gap is produced between the lower end portion 212 of the supporting member 210A and the bottom plate 237, and work of passing and looping over the belts 274, 294 via the gap can be performed. Accordingly, an assembly sequence that the supporting member 210A is fixed to the arm base 231 in advance, and then, the belts 274, 294 are looped over can be employed. On the other hand, the supporting member 210A is separately formed from the arm base 231, and thereby, also, in the first modified example, like the above described embodiment, an assembly sequence that the belts 274, 294 are looped over, and then, the supporting member 210A is attached to the arm base 231 can be employed.

Note that the supporting member 210A can suppress the swing of the wire 209 and support the wire 209 when the upper end portion 211 is fixed.

Further, in the first modified example, the upper end portion 211 of the supporting member 210A is fixed to the arm base 231 and the lower end portion 212 is separated from the arm base 231, however, the lower end portion 212 may be fixed to the arm base 231 and the upper end portion 211 may be separated from the arm base 231.

3. Second Modified Example

Next, a robot arm according to a second modified example will be explained.

Figure 9:
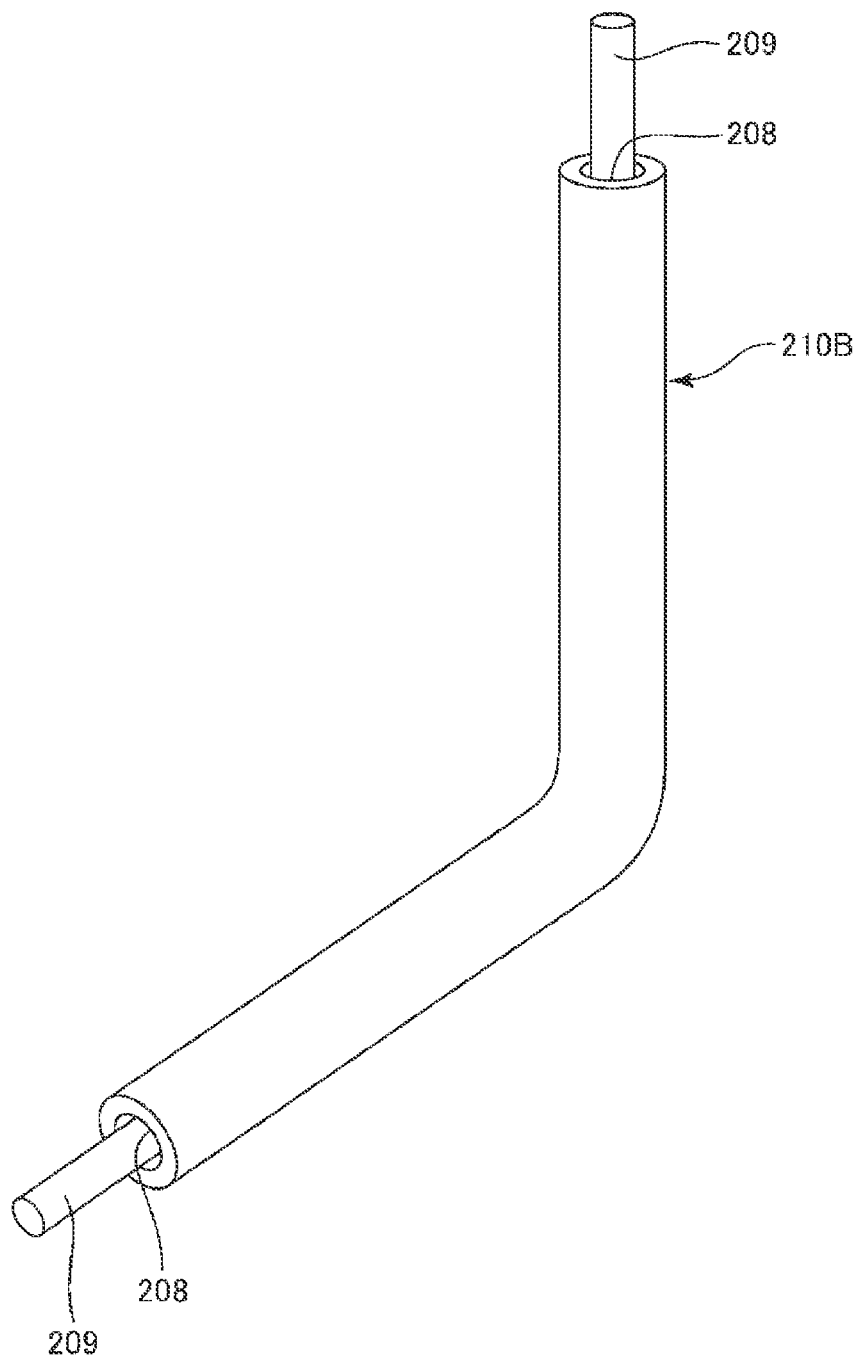
FIG. 9 is a partially enlarged perspective view showing a supporting member of a robot arm according to a second modified example.

FIG. 9 is a partially enlarged perspective view showing a supporting member 210B of a robot arm according to the second modified example.

As below, the second modified example will be explained. The following explanation will be made with a focus on the differences from the above described embodiment and the explanation of the same items will be omitted. Note that, in FIG. 9, the same configurations as those of the above described embodiment have the same signs.

The supporting member 210B shown in FIG. 9 is in a shape having a cross-section with a hollow portion 208. The cross-sectional shape is a sectional shape cut along a plane orthogonal to the longitudinal direction of the supporting member 210B. Specifically, as shown in FIG. 9, the cross-sectional shape of the supporting member 210B has an annular shape surrounding the circular hollow portion 208. At least a part of the wire 209 is routed within the hollow portion 208.

According to the configuration, at least a part of the wire 209 is housed in the hollow portion 208 and not exposed to the outside. Accordingly, the probability that the wire 209 contacts the belts 274, 294 shown in FIG. 8 or other objects may be especially reduced. As a result, the wire 209 is particularly harder to be damaged.

Note that the shape having the hollow portion 208 includes an annular shape partially cut (C shape) and an annular shape having a polygonal outer shape or the annular shape partially cut in addition to the above described annular shape. In a case of the C shape or an annular shape partially cut, the wire 209 may be inserted from the cut portion into the hollow portion 208. Accordingly, the supporting member 210B having the cross section is useful because the routing work of the wire 209 is easier.

4. Third Modified Example

Next, a robot arm according to a third modified example will be explained.

Figure 10:
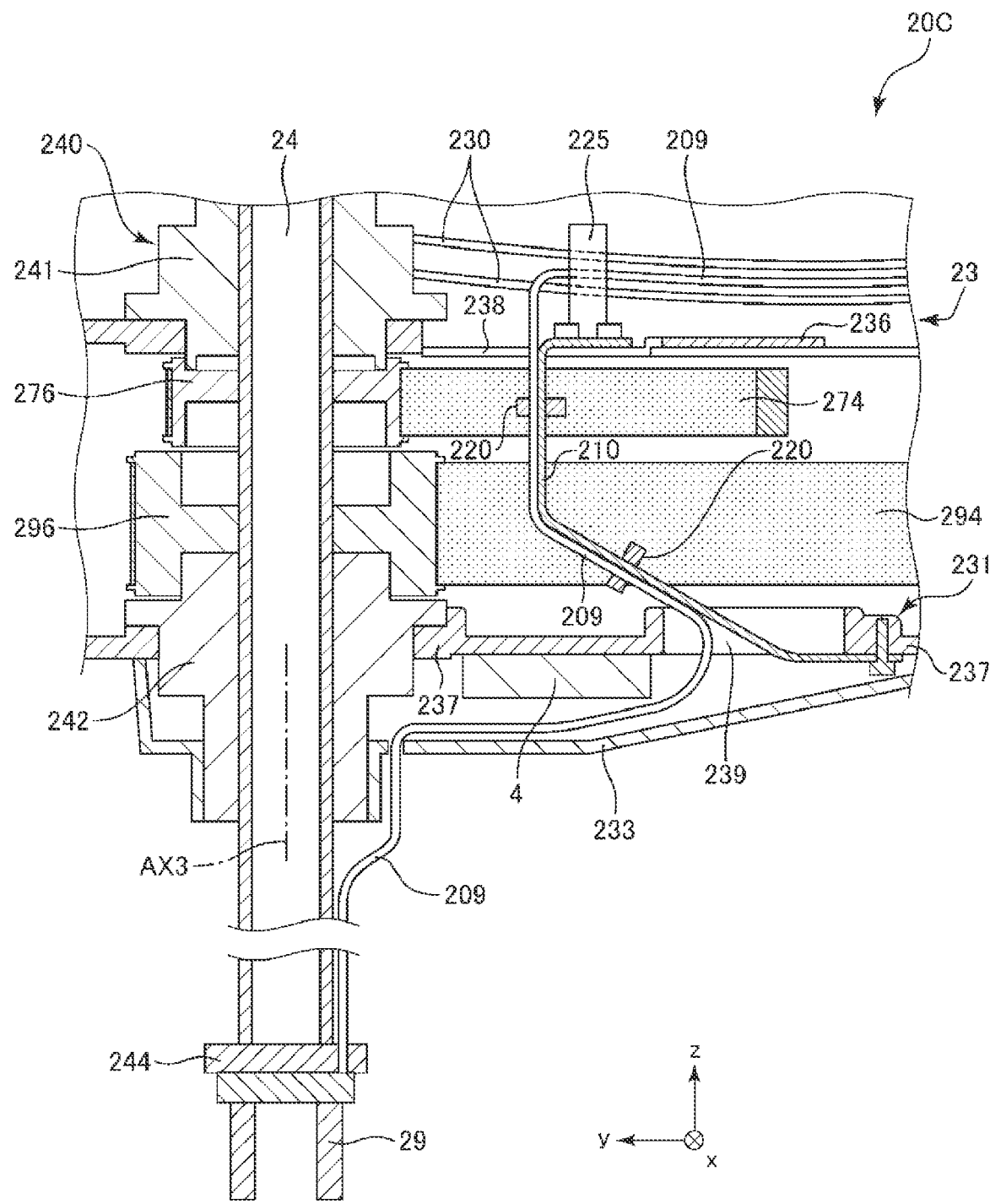
FIG. 10 is a partially enlarged sectional view showing a robot arm according to a third modified example.

FIG. 10 is a partially enlarged sectional view showing a robot arm 20C according to the third modified example.

As below, the third modified example will be explained. The following explanation will be made with a focus on the differences from the above described embodiment and the explanation of the same items will be omitted. Note that, in FIG. 10, the same configurations as those of the above described embodiment have the same signs.

In the robot arm 20C shown in FIG. 10, like the above described embodiment, the wire 209 is supported by the supporting member 210. On the other hand, in the robot arm 20C, the wire 209 is electrically coupled to the end effector 29.

The end effector 29 is attached to the distal end portion of the shaft 24. Accordingly, the wire 209 is supported by the supporting member 210, and thereby, like the above described embodiment, the path length of the wire 209 may be suppressed to be shorter and the influence by disturbance of the signal transmitted by the wire 209 may be suppressed. Further, the wire 209 is supported by the supporting member 210, and thereby, the swing of the wire 209 may be suppressed and damage on the wire 209 may be suppressed.

Note that the wire 209 may be a bundle of element wires. In this case, the wire 209 may be coupled to both the inertial sensor 4 and the end effector 29. Further, the wire 209 may be coupled to another functional unit than the end effector 29. The functional unit includes e.g. an image sensor such as a camera, various sensors including a depth sensor, a range sensor, and a force sensor, and a projector projecting an image.

As described above, the robot arm 20C according to the third modified example includes the second arm 23 (first member) and the shaft 24 (second member). The shaft 24 translates along the third axis AX3 located in the distal end portion of the second arm 23 or rotates around the third axis AX3.

Further, the second arm 23 has the arm base 231, the drive units 263, 264 generating the drive forces shown in FIG. 5, the joint portion 240, the belts 274, 294, the wire 209, and the supporting member 210 supporting the wire 209. The joint portion 240 has the driven pulleys 276, 296 and transmits the drive forces to the shaft 24. The belts 274, 294 transmit the drive forces generated by the drive units 263, 264 to the driven pulleys 276, 296. The wire 209 is routed to the region 200 surrounded by the driven pulleys 276, 296 and the belts 274, 294. Further, the supporting member 210 is provided in the region 200 and supports the wire 209.

According to the configuration, even when the wire 209 is subjected to the centrifugal force, the swing of the wire 209 may be suppressed. Thereby, the probability of the contact between the wire 209 and the belts 274, 294 may be reduced and the damage on the wire 209 may be suppressed.

Further, for example, when the functional unit like the end effector 29 is attached to the distal end portion of the shaft 24, the wire 209 may be easily coupled to the functional unit. Also, in the third modified example, the supporting member 210 is placed in the region 200, and thereby, the path length of the wire 209 may be suppressed to be shorter. Thereby, the wire 209 may be made lighter and the influence by disturbance of the signal transmitted by the wire 209 may be further suppressed.

As above, the robot arm and the robot system according to the present disclosure are explained based on the illustrated embodiments, however, the robot arm and the robot system according to the present disclosure are not limited to the above described embodiments. For example, the respective parts of the above described embodiments may be replaced by any configurations having the same functions, any configuration may be added to the above described embodiments, and a plurality of the above described embodiments may be combined.

What is claimed is:

1. A robot arm comprising:
a first arm pivotable around a first axis;
a second arm pivotable around a second axis parallel to the first axis; and
a shaft located in the second arm, the shaft translating along a third axis parallel to the second axis or rotating around the third axis,
the second arm having:
a base;
a first drive unit coupled to a first drive pulley and generating a first drive force;
a second drive unit coupled to a second drive pulley and generating a second drive force;
a joint portion having a first driven pulley and a second driven pulley, the joint portion transmitting the first drive force and the second drive force to the shaft;
an intermediate driven pulley provided at a position between the second drive unit and the second driven pulley;
a first belt looped over the first drive pulley and the first driven pulley;
an intermediate belt looped over the second drive pulley and the intermediate driven pulley;
a second belt looped over the intermediate driven pulley and the second driven pulley;
a sensor configured to detect vibration and provided at a position overlapping with a sensor region summed of a first region and a second region in a plan view along the third axis, the first region being surrounded by the first driven pulley and the first belt, the second region being surrounded by the second driven pulley and the second belt;
a supporting member having a columnar shape and partially located in the sensor region in the plan view along the third axis; and
a wire coupled to the sensor and supported by the supporting member in the sensor region in the plan view along the third axis, and
wherein the sensor is aligned with a straight line passing through the second axis and the third axis in the plan view along the third axis.

2. The robot arm according to claim 1, wherein
the supporting member extends by passing through inside of the first belt or the second belt, and
the wire is supported along the supporting member.

3. The robot arm according to claim 2, wherein
the base includes a first base member and a second base member facing each other via an internal space through which the first belt or the second belt passes, and
the supporting member has one end portion fixed to the first base member and another end portion fixed to the second base member.

4. The robot arm according to claim 2, wherein
the base includes a first base member and a second base member facing each other via an internal space through which the first belt or the second belt passes, and
the supporting member has one end portion fixed to the first base member and another end portion separated from the second base member.

5. The robot arm according to claim 3, wherein
the first base member has a first through hole penetrating the first base member along an axis parallel to the first, second, and third axes,
the second base member has a second through hole penetrating the second base member along an axis parallel to the first, second, and third axes, and
the wire is routed in a path passing through the first through hole, the internal space, and the second through hole.

6. The robot arm according to claim 1, wherein
the supporting member is in a shape having a cross-section with a hollow portion, and
at least a part of the wire is housed in the hollow portion.

7. The robot arm according to claim 1, further comprising an anchoring member anchoring the wire to the supporting member.

8. The robot arm according to claim 7, wherein
the supporting member has a narrower width portion with a partially narrower width, and
the anchoring member anchors the wire to the narrower width portion.

9. A robot arm comprising:
a first arm pivotable around a first axis;
a second arm pivotable around a second axis parallel to the first axis; and
a shaft located in the second arm, the shaft translating along a third axis parallel to the second axis or rotating around the third axis,
the second arm having:
a base;
a first drive unit coupled to a first drive pulley and generating a first drive force;
a second drive unit coupled to a second drive pulley and generating a second drive force;
a joint portion having a first driven pulley and a second driven pulley, the joint portion transmitting the first drive force and the second drive force to the shaft;
an intermediate driven pulley provided at a position between the second drive unit and the second driven pulley;
a first belt looped over the first drive pulley and the first driven pulley;
an intermediate belt looped over the second drive pulley and the intermediate driven pulley;
a second belt looped over the intermediate driven pulley and the second driven pulley;
a supporting member having a columnar shape and partially located in a support region contained in both a first region and a second region in a plan view along the third axis, the first region being surrounded by the first driven pulley and the first belt, the second region being surrounded by the second driven pulley and the second belt; and a wire supported by the supporting member in the support region in the plan view along the third axis.

10. A robot system comprising:
the robot arm according to claim 1; and
a control apparatus controlling a motion of the robot arm.

11. The robot arm according to claim 1, wherein
the sensor is provided in a position overlapping with a region contained in both the first region and the second region in the plan view along the third axis.

12. The robot arm according to claim 1, wherein
the first drive unit and the second drive unit are arranged along a direction orthogonal to the straight line in the plan view along the third axis.

13. The robot arm according to claim 1, wherein
at least a part of the wire is routed above the first belt and the second belt.

14. The robot arm according to claim 1, wherein
a first rotation axis of the second drive pulley is located away from the straight line in the plan view along the third axis, and
a distance between the straight line and a second rotation axis of the intermediate driven pulley is shorter than a distance between the straight line and the first rotation axis of the second drive pulley in the plan view along the third axis.

15. The robot arm according to claim 8, wherein
the narrower width portion is positioned in the sensor region in the plan view along the third axis.

* * * * *